United States Patent Office 3,130,195
Patented Apr. 21, 1964

3,130,195
DIOXAZINE DYESTUFFS
Jost von der Crone and Andre Pugin, Riehen, near Basel, Switzerland, assignors to J. R. Geigy A.-G., Basel, Switzerland
No Drawing. Filed May 18, 1962, Ser. No. 195,973
Claims priority, application Switzerland May 19, 1961
6 Claims. (Cl. 260—246)

The present invention concerns new dyestuffs of the dioxazine series, processes for the production thereof, their use for the dyeing and pigmenting of materials of all types and, as industrial product, the material dyed and pigmented therewith.

It has been found that new, difficultly soluble dioxazine dyestuffs of good colour strength are obtained if a dianil containing no sulphonic acid groups of the Formula I

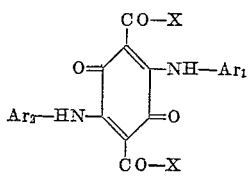

wherein $Ar_1$ and $Ar_2$ each represent an aryl radical which contains, in o-position to the NH group, a substituent which can be replaced or hydrogen, and which can contain other substituents usual in dyestuffs and fused heterocyclic rings, and wherein
X represents the primary or a secondary or tertiary amino group or the group —OR wherein R is an aliphatic, cycloaliphatic, araliphatic or aromatic radical,
is condensed by methods known per se, to form a compound of Formula II

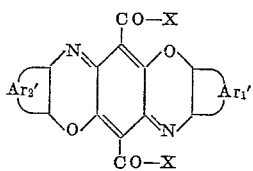

wherein $Ar_1'$ and $Ar_2'$ are each an arylene radical corresponding to $Ar_1$ and $Ar_2$, and
X has the meaning given in Formula I.

By "X" are termed in the first instance groups which are derived from amines of Formula III

wherein $R_1$ represents hydrogen, a possibly sustituted alkyl or cycloalkyl group, an aralkyl or aryl group,
$R_2$ represents hydrogen, a possibly substituted alkyl, cycloalkyl group or an aralkyl group, and
$R_1$ and $R_2$ together with the amino nitrogen atom also represent a heterocyclic ring, such as, for example, from ammonia, from alkylamines such as methylamine, ethylamine, propylamine, isopropylamine, n-, sec.- or tert.-butylamine, octylamine or decylamine, from hydroxyalkylamines such as β-hydroxyethylamine or γ-hydroxypropylamine, from alkoxyalkylamines such as β-methoxyethylamine or β-ethoxyethylamine, or γ-methoxypropylamine, γ-ethoxypropylamine or γ-phenoxypropylamine, from ω-diethylaminoalkylamines, from cycloalkylamines such as cyclohexylamine, from aralkylamines such as benzylamine, from arylamines, e.g. from phenylamine or a methylphenylamine, ethylphenylamine, dimethylphenylamine, methoxyphenylamine, ethoxyphenylamine, fluorophenylamine, chlorophenylamine, bromophenylamine, dichlorophenylamine, dibromophenylamine, nitrophenylamine, carbamoylphenylamine or dialkylaminophenylamine, from 1- or 2-naphthylamine, aminopyrene or aminoanthracene, also from dialkylamines, dicycloalkylamines, diaralkylamines, e.g. from dimethylamine, diethylamine, dipropylamine, dibutylamine, di-(β-hydroxyethyl)-amine, dicyclohexylamine, dibenzylamine or N-methyl-N-β-hydroxyethylamine, from N-alkyl-N-cycloalkylamines such as N-methyl-N-cyclohexylamine, from N-alkyl-N-aralkylamines such as N-methyl-N-benzylamine or from N-alkyl-N-arylamines such as N-methyl-N-phenylamine or N-ethyl-N-phenylamine or from cyclic secondary amines such as pyrrolidine, piperidine or morpholine. Particularly difficultly soluble and, therefore, preferred dioxazines of Formula II are those in which X is derived from ammonia or from a low alkylamine or from a possibly ring-substituted phenylamine.

If R in the grouping —OR is in aliphatic radical, then it is chiefly a low alkyl radical, e.g. the methyl, ethyl, propyl, isopropyl, n-, sec. or tert. butyl radical; however, it can also be a medium to higher alkyl radical such as the octyl, decyl, dodecyl, tetradecyl, hexadecyl or octadecyl radical. R can also be a hydroxyalkyl radical, e.g. the 2-hydroxyethyl or 3-hydroxypropyl radical. If R is a cycloaliphatic radical, then it is, e.g. the cyclohexyl radical; if it is an araliphatic radical then it is, e.g. the benzyl radical or a methylbenzyl or a chlorobenzyl radical; examples of aromatic radicals symbolised by R are chiefly the phenyl radical as well as the 2-, 3- or 4-methylphenyl radical or the 2-, 3- or 4-chlorophenyl radical.

In Formula I, the radicals $Ar_1$ and $Ar_2$ are of the benzene or naphthalene series, preferably the benzene series. They can be identical or different; advantageously they are identical. They contain, for example, an ether or thioether group or the hydroxyl group as replaceable substituent in o-position to the NH group. Examples of ether groups are alkoxy, cycloalkoxy, aralkoxy or aryloxy groups, principally low alkoxy groups such as the methoxy, ethoxy, propoxy, isopropoxy or n-, sec. or tert. butoxy group or aryloxy groups such as the phenoxy, methylphenoxy or chlorophenoxy group.

Examples of other substituents usual in dyestuffs which are contained in $Ar_1$ and $Ar_2$ or in $Ar_1'$ and $Ar_2'$ are: aliphatic, cycloaliphatic, araliphatic or aromatic groups, other ether groups such as alkoxy, hydroxyalkoxy, aralkoxy or aryloxy groups; thioether groups such as alkylmercapto or arylmercapto groups; also halogens, the nitro, cyano or trifluoromethyl group, the primary amino group, possibly N-substituted carboxylic and sulphonic acid amide groups, carboxylic acid and sulfonic acid aryl ester groups, alkylsulphonyl and arylsulphonyl groups, acyl and acylamino groups, "acyl" being the broadest sense and meaning, for example, a carbacyl radical, a carbonic acid monoester, carbamyl, thiocarbamyl or a 1,3,5-triazinyl radical; preferably however, it is a carbacyl radical. As fused heterocyclic rings, $Ar_1$ and $Ar_2$ or $Ar_1'$ and $Ar_2'$ contain, for example, an indole ring.

Examples of carbacyl radicals are carbonic acid groups of saturated or unsaturated, mono- or poly- basic aliphatic, cycloaliphatic, araliphatic or aromatic carboxylic acids such as, e.g. formic acid, acetic acid, propionic acid, butyric acid, cyclohexyl carboxylic acid, phenylacetic acid or benzoic acid.

Carbonic acid monoester groups which, for example, can be components of the acyl or acylamino group are carbomethoxy or carboethoxy groups, carbocyclohexyloxy groups, carbobenzyloxy groups or carbophenoxy groups.

Examples of carbamoyl or thiocarbamoyl radicals are

N-methyl, N-ethyl, N-propyl, N-butyl, N-cyclohexyl, N-benzyl, or N-phenyl carbamoyl or thiocarbamoyl groups.

Examples of 1,3,5-triazinyl radicals are the 4,6-bis-phenyl-, 4,6-bis-phenylamino-, 4,6-bis-(2'- or 4'- chlorophenylamino)- or 4,6-bis-morpholino- 1,3,5-triazinyl-(2) radicals.

Preferred dioxazine dyestuffs which can be produced according to the invention are those in which X is a low alkoxy group and is principally an amino group, a low alkylamino or an arylamino group. If X is a low alkoxy group, then those dyestuffs in which $Ar_1'$ and $Ar_2'$ are phenyl radicals unsubstituted in the p-position to the nitrogen atom of the oxazine ring or phenyl radicals substituted by a low alkanoylamino, aroylamino or a low carbalkoxy group, and in which the p-position to the oxygen atom is unsubstituted or is substituted by a chlorine atom, a low alkyl or alkoxy group, are distinguished in particular by very good dyeing properties.

Dianils of Formula I usable according to the invention as starting materials are obtained, for example, by reacting the corresponding 2,5-bis-halogen-1,4-benzoquinone-3,6-dicarboxylic acid diamide or the 2,5-bis-halogen-1,4-benzoquinone-3,6-dicarboxylic acid diester with the amines $Ar_1$—$NH_2$ and $Ar_2$—$NH_2$ respectively, for example in a low alcohol such as methanol or ethanol, possibly in the presence of an acid buffering agent, such as alkali hydroxide, e.g. sodium hydroxide, or earth alkali oxide or hydroxide, e.g. magnesium oxide, alkali carbonate, an alkali metal salt of a low fatty acid, e.g. sodium acetate or tertiary bases such as pyridine.

The 2,5-bis-halogen-1,4-benzoquinone-3,6-dicarboxylic acid diamides are new. They are obtained, for example, from the known 2,5-bis-halogen-1,4-dialkoxybenzene-3,6-dicarboxylic acid diesters by saponification of the diester to form dicarboxylic acid, conversion of this into its dicarboxylic acid amide, then de-alkylation of the dialkoxy compound to the dihydroxy compound and oxidation of the latter to form the quinone.

The 2,5-bis-halogen-1,4-benzoquinone-3,6-dicarboxylic acid diesters are produced in their turn by methods known per se, for example, by treatment of a 2,5-dihydroxyterephthalic acid diester with chlorine or bromine, possibly in an organic solvent, or by reacting succinylosuccinic acid diester with gaseous chlorine or bromine and subsequent oxidation, e.g. with nitric acid, possibly in the presence of an organic solvent.

The dianils of Formula I so produced are advantageously isolated before they are converted into the dioxazine compounds of Formula II. However, in some cases it is possible to convert the substances used for the production thereof direct into the dioxazine dyestuffs of Formula II without isolating these dianils.

Compounds of Formula I are condensed to the dioxazine dyestuffs of Formula II by heating in inert organic solvents, possibly in the presence of acids or of agents splitting off acid, if necessary in the presence of oxidising agents.

Suitable inert organic solvents are e.g. possibly halogenated aromatic hydrocarbons of the benzene or naphthalene series, e.g. xylenes, di- and tri- chlorobenzenes, naphthalene or chloronaphthalenes, alcohols and esters thereof such as ethanol, propanol, butanol, ethylene glycol as well as their acetates, benzoates or phthalates.

Suitable acids are, for example, concentrated inorganic oxygen acids such as sulphuric acid or polyphosphoric acids and also strong organic acids such as di- or tri-halogen acetic acids.

Examples of compounds which split off acid are, in particular, the acid halides of carboxylic or sulphonic acids such as benzoyl chloride, methylbenzoyl chloride or chlorobenzoyl chloride, benzene- or 4- methylbenzenesulphonic acid chloride, acid chlorides such as thionyl chloride or phosphorus pentachloride and also metal chlorides such as aluminium chloride, ferric chloride or zinc chloride. In this connection the metal chlorides are used advantageously in the presence of organic nitrogen bases such as pyridine.

Examples of suitable oxidising agents are atmospheric oxygen and also aromatic nitro compounds, i.e. nitrobenzene or nitrobenzene sulphonic acid.

The choice of condensing agent and conditions depends on the starting compounds used.

Thus, for example, dianils of Formula I in which $Ar_1$ and $Ar_2$ each contain an ether group as replaceable substituent in o-position to the NH group, are heated from 100 to 300° C., preferably from 140–200° C., advantageously in a mixture consisting of an inert organic solvent and an agent splitting off acid. When dianils of Formula I containing acylamino groups are used with excess organic acid halide as agent splitting off acid, it is to be noted that if the acyl groups of the acylaminoquinone of Formula I and those of the acid halide are not identical, in some cases exchange of the acyl groups occurs.

Dianils of Formula I in which each of $Ar_1$ and $Ar_2$ is a 4-acylaminophenyl radical containing an ether group in the 2- and 5-position can be condensed even in the cold in acids, i.e. in concentrated inorganic oxygen acids such as sulphuric acid, to form the corresponding dioxazine. In this condensation in many cases the acylamino groups are saponified to amino groups. It is also possible to convert these dianils into the dioxazine compounds by heating in inert organic solvents without any other additives.

Dianils of Formula I in which each of $Ar_1$ and $Ar_2$ is an aromatic radical substituted by a hydroxyl group in o-position to the NH group, can be condensed at relatively low temperatures in an inert organic solvent, e.g. in ethanol or glacial acetic acid, to form dioxazine compounds of Formula II.

Dianils of Formula I in which each of $Ar_1$ and $Ar_2$ is an aromatic radical containing hydrogen in the o-position to the NH group are condensed advantageously in an organic solvent in the presence of an oxidising agent and, possibly, of an agent splitting off acid.

A modification of the process according to the invention for the production of dyestuffs of the dioxazine series consists in saponifying a compound of Formula IV

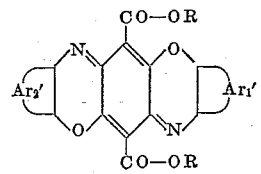

wherein $Ar_1'$ and $Ar_2'$ each represent an arylene radical which can contain substituents usual in dyestuffs and fused heterocyclic rings, and R represents an aliphatic, cycloaliphatic, araliphatic or aromatic radical, to form the corresponding dicarboxylic acid, converting this into its dicarboxylic acid chloride or bromide and reacting the latter with ammonia or with a primary or secondary amine or with an aliphatic, cycloaliphatic, araliphatic or aromatic alcohol.

The starting materials of Formula IV correspond to the compound of the Formula II of the present invention in which X represents the group —OR and, therefore, can be produced by the first production process mentioned.

Examples of primary or secondary amines usable according to the invention are those given in the discussion of X above. The saponification as defined of the dioxazine-9,10-dicarboxylic acid ester of Formula IV to the dicarboxylic acid is performed advantageously in 70–95% sulphuric acid and the dicarboxylic acid is converted into its chloride or bromide and this is reacted to form the dicarboxylic acid amide of Formula II by known methods.

High yields of the dioxazine compounds of Formula II according to the invention are obtained. Generally they crystallise almost completely and in very pure form already in the hot reaction mixture. They have the characteristic properties of dioxazine dyestuffs, for example they give a blue solution in concentrated sulphuric acid and the crystals have a metallic shimmer. They are isolated by filtering off and further purified by washing the precipitate with organic solvents and aqueous acids or bases.

The dioxazine dyestuffs which dissolve with difficulty in organic solvents can be used as pigment dyestuffs. For this purpose they are advantageously employed in finely dispersed form which form is attained, for example, by dissolving them in acid and diluting the solutions with water. Examples of solvents are sulphuric acid, aliphatic or aromatic carboxylic acids or sulphonic acids. Fine distribution can also by obtained, however, by milling, advantageously in the presence of milling additives such as organic solvents, acids of bases.

Solid or liquid organic solvents can be used at room temperature. For example, the pigment dyestuffs isolated from the reaction mixture and dried are milled with anhydrous calcium chloride or with sodium sulphate or sodium chloride in the presence of aliphatic or aromatic, possibly chlorinated and/or nitrated hydrocarbons such as cyclohexane, benzene, toluene, naphthalene, mono- di- or tri-chlorobenzene, tetrachloroethane or nitrobenzene, low aliphatic ketones such as, e.g. acetone, or low aliphatic mono-alcohols, e.g. methanol, ethanol, methoxy- or ethoxy-ethanol, or nitrogen compounds such as dimethylaniline or diethylaniline, quinoline or dimethyl formamide. In some cases, the pigments can be finished also by milling with organic solvents alone without the addition of salts. After milling, the auxiliaries are removed, inorganic salts, for example, are dissolved with water and organic auxiliaries are removed possibly by distillation or with steam.

In this way, finely dispersed, red, orange, bordeaux, blue and violet pigments of remarkable colour strength and purity are obtained which, compared with the crude products, have a softer texture. They can be used for the pigmenting of varnishes, rubber, lacquers, e.g., stoving lacquer, and synthetic substances such as polyvinyl chloride. They are also very suitable for the production of printing colours for paper and also for the colouring of viscose and cellulose material in the mass. The prints obtained therewith are distinguished by great colour strength and also by good fastness to solvents, cross-lacquering, migration and heat.

A preferred class of dioxazine dyestuffs according to the invention corresponds to the Formula V

wherein

X represents cyclohexyloxy, an alkoxy group especially one containing 1 to 8 carbon atoms such as methoxy, ethoxy, isopropoxy, butoxy, isobutoxy or octyloxy, a mononuclear aryloxy group especially phenoxy, chlorophenoxy, methylphenoxy, dichlorophenoxy, dimethylphenoxy, a mononuclear aralkoxy group especially benzyloxy, methylbenzyloxy, chlorobenzyloxy, or di-chlorobenzyloxy, and the group

wherein $R_1$ is hydrogen, lower alkyl especially methyl, ethyl, or butyl, an aryl group especially phenyl, chlorophenyl, methylphenyl, dichlorophenyl, dimethylphenyl, nitrophenyl or naphthyl, an aralkyl group especially benzyl, chlorobenzyl, methylbenzyl, dichlorobenzyl, and wherein $R_2$ is hydrogen or a lower alkyl group especially methyl, ethyl or butyl, and $R_1$ and $R_2$ when taken together with the adjacent nitrogen atom are a pyrrolidino, piperidino or morpholino group, Z represents chlorine, hydrogen, a lower alkyl group especially methyl, a lower alkoxy group especially methoxy or ethoxy, an aroyl group especially benzoyl, a lower alkylsulphonyl group especially $CH_3$—$SO_2$—, $C_2H_5$—$SO_2$—, a lower carbalkoxy group especially carbomethoxy or carboethoxy, —CO—NH—$R_3$, wherein $R_3$ is a mononuclear aryl group especially the phenyl, methylphenyl, chlorophenyl, dimethylphenyl or dichlorophenyl, Y represents hydrogen, amino, a lower alkanoylamino especially acetylamino, propionylamino, a lower alkoxy group especially methoxy or ethoxy, a lower carbalkoxy amino group especially carbomethoxy- or carboethoxy-amino, a mononuclear aroylamino group especially benzoylamino, chlorobenzoylamino, dichlorobenzoylamino, methylbenzoylamino, dimethylbenzoylamino, a mononuclear aryloxy group especially phenoxy, methylphenoxy, methoxyphenoxy, chlorophenoxy and a mononuclear aralkoxy group especially benzyloxy.

Particularly good dioxazine dyestuffs are those compounds of the Formula V, wherein X represents the group

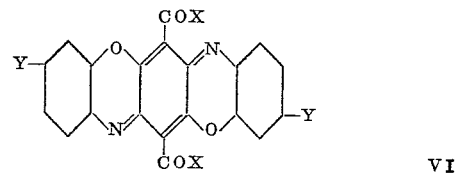

wherein $R_1$ represents hydrogen, a lower alkyl especially methyl or ethyl, phenyl, chlorophenyl, methylphenyl or benzyl and $R_2$ is hydrogen.

Of these particularly good dioxazine dyestuffs, the compounds having the formula

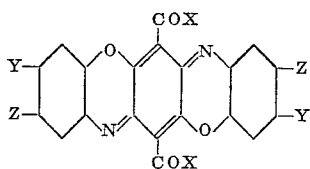

VI wherein

X represents amino, methylamino, ethylamino or chlorophenylamino, and

Y represents hydrogen, phenoxy or methylphenoxy, are especially valuable in particular because of their shade.

Further details will be seen from the following examples. Where not otherwise expressly stated, parts are given therein as parts by weight. The temperatures are in degrees centigrade. The relationship of parts by weight to parts by volume is as that of grammes to cubic centimetres.

EXAMPLE 1

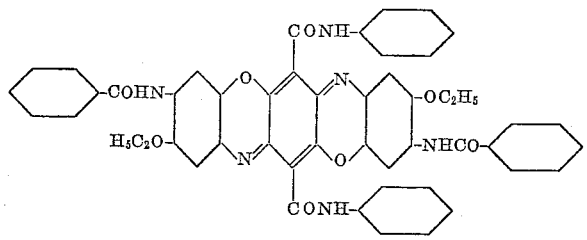

12 parts of 1-amino-2,5-diethoxy-4-benzoylaminobenzene, 10.8 parts of 2,5-dibromo-1,4-benzoquinone-3,6-dicarboxylic acid dianilide and 5.5 parts of crystallised sodium acetate in 300 parts of ethanol are boiled for 2 hours while stirring. The precipitate formed is filtered off hot, washed with ethanol and water and dried. 15.7 parts of a violet-brown coloured dianil are obtained. M.P. 258°.

To convert into the dioxazine compound, the dianil is heated for 1 hour at 170–175° in 200 parts of o-dichlorobenzene with 10 parts of benzoyl chloride. The pigment formed is filtered off hot, washed with o-dichlorobenzene, ethanol and water and dried. 12 parts of a crystalline product which has a green metallic shimmer are obtained. The product dissolves in concentrated sulphuric acid with a dull blue colour. To attain a fine distribution, it is milled with sodium chloride or calcium chloride in the presence of a small amount of a petroleum fraction which boils at 180–220° C. After removing the salt and solvent, a violet pigment is obtained which has high colour strength and good fastness to light, heat, cross-lacquering and migration.

The 2,5 - dibromo-1,4-benzoquinone-3,6-dicarboxylic acid dianilide used is an orange-brown compound which is insoluble in the usual organic solvents and decomposes at 255°. It is obtained from the known 2,5-dibromo-1,4-dimethoxybenzene-3,6-dicarboxylic acid diethyl ester by way of the dicarboxylic acid (M.P. 265°), the dicarboxylic acid dichloride (M.P. 136°), the dianilide (M.P. unclear at 316°), demethylation with aluminium chloride to form the dihydroxy compound (sinters at 260°) followed by oxidation to the corresponding quinone.

Pigments having similar properties are obtained if, in this example, the 12 parts of 1-amino-2,5-diethoxy-4-benzoylaminobenzene are replaced by 13.4 parts of 1-amino-2,5 - diethoxy-4-(4′-chlorobenzoylamino)-benzene or by 12.6 parts of 1-amino-2,5-diethoxy-4-(4′-methylbenzoylamino)-benzene.

EXAMPLE 2

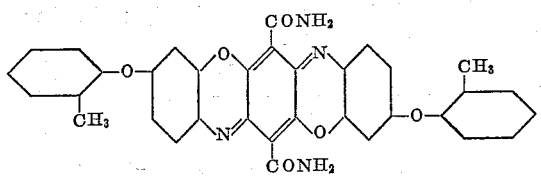

6.1 parts of 1-amino-2,4-di-(2′-methylphenoxy)-benzene, 3.5 parts of 2,5-dibromo-1,4-benzoquinone-3,6-dicarboxylic acid amide and 0.4 part of magnesium oxide in 100 parts of ethanol are stirred for 1 hour under reflux. The pale red-brown coloured dianil compound formed is filtered off hot, washed with ethanol and water and dried.

The dioxazine compound is formed by thermic ring closure by heating the dianil in 100 parts of chloronaphthalene for 30 minutes at 220–230°. A bordeaux-red to violet coloured solution is formed, from which the dioxazine compound separates simultaneously in the form of fine needles. It is filtered off under suction at 150° and washed with ethylene glycol monoethyl ether and a mixture of ethylene glycol monoethyl ether and 2 n caustic soda lye in a ratio of 9:1 until the filtrate runs colourless. Finally it is washed with dilute acetic acid and water and then dried.

After milling analogously to Example 1, a red-brown pigment of good colour strength is obtained which has excellent fastness to light, heat, migration and cross-lacquering. Similarly strong-coloured dioxazines are given in the following Table I, in which the substituents X according to Formula II are given in column A, the colour of the solution of the dioxazine compound in concentrated sulphuric acid is given in column B and the colour of solution of the dioxazine compound in boiling chloronaphthalene is given in column C.

Table I

| No. | Substituent X according to Formula II — A | Colour of solution in concentrated sulphuric acid — B | Colour of solution in boiling chloronaphthalene — C |
| --- | --- | --- | --- |
| 1 | —NHCH₃ | Blue | Bordeaux |
| 2 | —NHCH₂—⌬ | do | Do |
| 3 | —NH—⌬—Cl | do | Do |
| 4 | —NH—⌬(CH₃)—CH₃ | Green-blue | Reddish violet |
| 5 | —N(CH₂—CH₂)₂O | Blue | Bordeaux |
| 6 | —NH—⌬—NO₂ | Green-blue | Brownish red |
| 7 | —NH—(naphthyl) | do | Reddish violet |
| 8 | —N(CH₃)—⌬ | Blue | Red |
| 9 | —NH—CH₂CH₃ | do | Bordeaux |
| 10 | —NH—CH₂CH₂CH₂CH₃ | do | Do |
| 11 | —NH—CH₂—⌬—Cl | do | Do |
| 12 | —NH—CH₂—⌬(Cl,Cl) | do | Do |
| 13 | —NH—CH₂—⌬—CH₃ | do | Do |
| 14 | —NH—CH₂—⌬—CH₃ | do | Do |
| 15 | —NH—⌬(Cl,Cl) | do | Do |
| 16 | —N(CH₂—CH₂)₂CH₂ | do | Do |
| 17 | —N(CH₂—CH₂)₂CH₂CH₂ | do | Do |
| 18 | —NH—⌬—CH₃ | Green-blue | Brownish-red |
| 19 | —N(CH₂—CH₃)—⌬ | Blue | Red |
| 20 | —N(CH₂—CH₂—CH₂—CH₃)—⌬ | do | Do |
| 21 | —N(CH₂—CH₃)—⌬—CH₃ | do | Do |

The above dioxazine dyestuffs are obtained if the 2,5-dibromo-1,4-benzoquinone-3,6-dicarboxylic acid diamides corresponding thereto are reacted by the process described in Example 1 with 1-amino-2,4-di(2'-methylphenoxy)-benzene. These quinones are obtained from 2,5-dibromo-1,4-dimethoxybenzene-3,6-dicarboxylic acid diethyl ester by the process described in Example 1. They are all yellowish to brown coloured products which are difficultly soluble in the usual organic solvents.

EXAMPLE 3

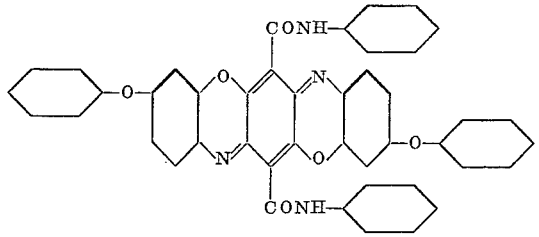

11.1 parts of 1-amino-2,4-diphenoxybenzene and 10.1 parts of 2,5-dibromo-1,4-benzoquinone-3,6-dicarboxylic acid dianilide are condensed as described in Example 2 to form the dianil compound and the dioxazine compound is formed therefrom by ring closure. In this way 9.5 parts of dyestuff are obtained in the form of fine, dark red needles, the analysis of which agrees exactly with the calculated formula $C_{44}H_{28}N_4O_6$. On milling in the presence of inorganic salts such as calcium chloride, a strong coloured, bordeaux-red coloured pigment is obtained which has a high degree of fastness to light migration, cross-lacquering and heat.

Dioxazines having similar properties are summarised in the following Table II. They are produced from dianils of the general Formula I by the process described in the above example. Column I gives the substituents $NH-Ar_1$ or $NH-Ar_2$ of the dianil used; column 2 gives the colour of the dianil; column 3 gives the colour of the solution in concentrated sulphuric acid of the dioxazine dyestuff obtained and column 4 gives the colour of a polyvinyl chloride film obtained with the dioxazine pigment.

Table II

| No. | $NH-Ar_1$ group according to Formula I | Colour of dianil | Colour of solution in concentrated sulphuric acid | Colour in polyvinyl chloride films |
|---|---|---|---|---|
| 1 | —NH—⟨⟩—O—⟨⟩—Cl (with Cl, and O—⟨⟩—Cl substituent) | Dark brown | Blue | Red. |
| 2 | —NH—⟨⟩—O—⟨⟩—Cl (with O—⟨⟩—Cl substituent) | do | do | Reddish violet. |
| 3 | —NH—⟨⟩—O—⟨⟩—OCH₃ (with O—⟨⟩—OCH₃ substituent) | do | do | Do. |
| 4 | —NH—⟨⟩—O—⟨⟩—Cl (with Cl, and O—⟨⟩—Cl substituent) | Pale brown | Deep blue | Orange. |
| 5 | —NH—⟨⟩—O—⟨⟩—Cl (with COOCH₃, and O—⟨⟩—Cl substituent) | do | do | Do. |
| 6 | —NH—⟨⟩—OCH₃ (with OCH₃ substituent) | Blue violet | Blue | Violet. |
| 7 | —NH—⟨⟩—OC₂H₅ (with OC₂H₅ substituent) | Dark brown | do | Reddish violet. |
| 8 | —NH—⟨⟩—CONH—⟨⟩—Cl,Cl (with O—⟨⟩ substituent) | Brown | Deep blue | Red. |

Table II—Continued

| No. | NH-Ar₁ group according to Formula I | Colour of dianil | Colour of solution in concentrated sulphuric acid | Colour in polyvinyl chloride films |
|---|---|---|---|---|
| 9 | —NH—⬡(—O—⬡)(—CONH—⬡(Cl)(Cl)) | Brown | Deep blue | Blueish red. |
| 10 | —NH—⬡(—O—⬡)(—CONH—⬡) | do | do | Reddish violet. |
| 11 | —NH—⬡(—O—⬡)(—SO₂CH₃) | Red-brown | Violet | Orange. |
| 12 | —NH—⬡(—O—⬡)(—Cl) | Yellow-brown | Dull blue | Red. |
| 13 | —NH—⬡(—O—⬡)(—CH₃) | Dark-brown | Blue | Do. |
| 14 | —NH—⬡(—S—⬡)(—S—⬡) | Brown | Dull violet | Violet. |
| 15 | —NH—⬡(—O—⬡)(—CO—⬡) | Pale-brown | Reddish-blue | Red. |
| 16 | —NH—⬡(—O—⬡)(—O—⬡)(—CO—⬡) | Brown | Blue | Blueish red. |
| 17 | —NH—⬡(—O—⬡)(—O—⬡)(—CONH—⬡(Cl)(Cl)) | do | do | Do. |

Table II—Continued

| No. | NH-Ar₁ group according to Formula I | Colour of dianil | Colour of solution in concentrated sulphuric acid | Colour in polyvinyl chloride films |
|---|---|---|---|---|
| 18 | —NH—⬡(COOC₂H₅)—O—⬡—Cl, O—⬡—Cl | Pale-brown | Deep blue | Orange. |
| 19 | —NH—⬡(CONH—⬡(Cl,Cl))—O—⬡ | Brown | ___do___ | Blueish red. |
| 20 | —NH—⬡(CONH—⬡(CH₃,CH₃))—O—⬡ | ___do___ | ___do___ | Red. |
| 21 | —NH—⬡(CONH—⬡—Cl)—O—⬡ | ___do___ | ___do___ | Do. |
| 22 | —NH—⬡(CONH—⬡—CH₃)—O—⬡ | ___do___ | ___do___ | Do. |
| 23 | —NH—⬡(SO₂CH₂CH₃)—O—⬡ | Red-brown | Violet | Orange. |
| 24 | —NH—⬡—O—CH₂—⬡, O—CH₂—⬡ | Dark brown | Blue | Reddish violet. |

EXAMPLE 4

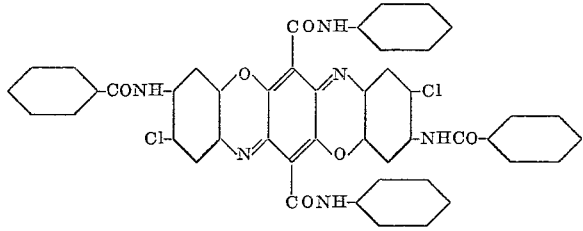

16.6 parts of 1-amino-2-phenoxy-4-benzoylamino-5-chlorobenzene, 8.3 parts of 2,5-dichloro-1,4-benzoquinone-3,6-dicarboxylic acid dianilide and 8.2 parts of anhydrous sodium acetate in 200 parts of chloronaphthalene are heated to 220–240° while stirring and kept for half an hour at this temperature. The reaction mixture turns blueish red during the reaction and the dioxazine compound formed separates. It is filtered off hot and worked up as described in Example 2. 16.5 parts of a brownish red product are obtained which, after milling with inorganic salts such as calcium chloride, is a violet pigment which has a high degree of fastness to light and migration. If instead of 1-amino-2-phenoxy-4-benzoylamino - 5 - chlorobenzene, 1 - amino - 2 - methoxy - 4-benzoylamino-5-methylbenzene is used, then a somewhat more blueish pigment having similar properties is obtained.

The 2,5 - dichloro - 1,4 - benzoquinone - 3,6 - dicarboxylic acid dianilide is produced by the same process as described in Example 1 for the corresponding dibromo-compound from the known 2,5-dichloro-1,4-dimethoxy-benzene-3,6-dicarboxylic acid diethyl ester.

EXAMPLE 5

24 parts of 1-amino-2,5-diethoxy-4-benzoylamino-benzene, 15.3 parts of 2,5-dibromo-1,4-quinone-3,6-dicarboxylic acid dimethyl ester and 1.65 parts of magnesium oxide are refluxed in 400 parts of ethanol for 2 hours. The dark, crystalline precipitate which forms is filtered off hot, washed with ethanol and water and dried. In this way, 28.9 parts of a dianil compound are obtained. To convert into the dioxazine compound, it is heated for 1 hour at 170–175° in 250 parts of o-dichlorobenzene with 7.5 parts of benzoyl chloride. The pigment formed is filtered off at 100°, washed with 1,2-dichlorobenzene, ethanol and water and dried. 22 parts of a beautiful crystalline product having a greenish to bronze-coloured metallic shimmer are obtained. The elementary analysis corresponds to the formula

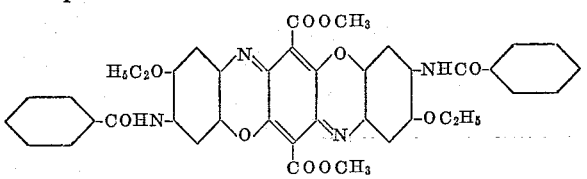

On milling the crystalline product with sodium or calcium chloride in the presence of a small amount of xylene or mineral oil, and after removing the salt and solvent, a blue pigment is obtained which has very great colour strength and good fastness to light, heat, cross-lacquering and migration. A pigment having similar good properties and a similar shade is obtained if, in this example, the 1-amino-2,5-diethoxy-4-benzoylaminobenzene is replaced by 24.5 parts of 1-amino-2,5-diethoxy-4-(4'-chlorobenzoylamino)-benzene.

Elementary analysis for $C_{38}H_{26}O_{10}N_4Cl_2$—Calculated: C, 59.4; H, 3.38; N, 7.29. Found: C, 59.84; H, 3.33; N, 7.35.

The 2,5-dibromo-1,4-quinone-3,6-dicarboxylic acid dimethyl ester (M.P. 250–251°) is obtained, for example, by bromination of 2,5-dihydroxy-terephthalic acid dimethyl ester in glacial acetic acid.

EXAMPLE 6

If, in Example 5, the amino-2,5-diethoxy-4-benzoylaminobenzene is replaced by 20.2 parts of 1-amino-2,5-diethoxy-4-acetylaminobenzene, then 17.7 parts of a dark coloured dianil compound are obtained. This product is heated to 170° in 200 parts of o-dichlorobenzene and, at this temperature, 4 parts of acetyl chloride are added dropwise within 1 hour whereupon the reaction mixture becomes violet coloured. After cooling, the dioxazine dyestuff formed is filtered off, washed with ethanol and water and dried. In this way, 8.3 parts of a crystalline product are obtained which, after milling with inorganic salts, is a violet pigment. The pigment has great colour strength and good fastness to light and cross-lacquering. A pigment having a similar shade and good properties is obtained if, in this example, the 2,5-dibromo-1,4-quinone-3,6-dicarboxylic acid dimethyl ester is replaced by 15.1 parts of 2,5-dichloro-1,4-quinone-3,6-dicarboxylic acid dibutyl ester.

Elementary analysist for $C_{36}H_{40}O_{10}N_4$—Calculated: C, 62.75; H, 5.81; N, 8.14. Found: C, 62.73; H, 5.75; N, 8.17.

The 2,5-dichloro-1,4-quinone-3,6-dicarboxylic acid dibutyl ester (M.P., 97°) is obtained by chlorination of dihydroxy-terephthalic acid dibutyl ester in glacial acetic acid.

EXAMPLE 7

24 parts of 1-amino-2,5-diethoxy-4-benzoylaminobenzene, 16.4 parts of 2,5-dibromo-1,4-quinone-3,6-dicarmoxylic acid diethyl ester and 16.5 parts of magnesium oxide in 400 parts of ethanol are refluxed for 1 hour while stirring. The dark precipitate formed is filtered off hot, washed with ethanol and water and dried. 30.4 parts of dianil compound are obtained, the ring of which is thermically closed by heating in 200 parts of nitrobenzene for 10 hours at 180°. The product is then filtered off under suction at room temperature, washed with ethanol and water and dried. A crystalline product having a metallic shimmer is obtained which, on milling with anhydrous calcium chloride, produces a blue pigment of strong colour which has excellent fastness to light, cross-lacquering, heat and migration.

If, in this example, 24.4 parts of 3-amino-4-phenoxybenzoic acid-anilide are used instead of 24 parts of 1-amino-2,5-diethoxy-4-benzoylaminobenzene, a red pigment which is fast to cross lacquiring is obtained.

The 2,5-dibromo-1,4-quinone-3,6-dicarboxylic acid diethyl ester (M.P. 227°) can be produced, for example, by brominating succinylosuccinic acid diethyl ester with gaseous bromine and subsequently oxidising with concentrated nitric acid in ethanol.

EXAMPLE 8

24 parts of 1-amino-2,5-diethoxy-4-benzoylaminobenzene, 15.1 parts of 2,5-dichloro-1,4-quinone-3,6-dicarboxylic acid dibutyl ester and 1.65 parts of magnesium oxide in 400 parts of ethanol are condensed by heating under reflux for 1 hour. After filtering, washing the residue with ethanol and water and drying, 33 parts of a dark crystalline product are obtained which melts at 218–220°. The product in 160 parts of 1,2-dichlorobenzene is heated with 5 parts of benzoyl chloride for 1 hour at 170–175°. The dyestuff formed is filtered off under suction cold, washed with ethanol and water and dried. 12.1 parts of a crystalline product having a bronze-coloured metallic shimmer are obtained. After milling in the presence of inorganic salts such as calcium chloride, a strong coloured blue, extraordinarily pure pigment is obtained which has good stability to light, cross-lacquering and heat.

Blue pigments having similarly good properties are obtained if, in this example, the 2,5-dichloro-1,4-quinone-3,6-dicarboxylic acid dibutyl ester is replaced by the esters given in column II of the following table. Column I shows the number of parts of ester used, column III gives the colour and column IV gives the elementary analysis of the dioxazine pigments.

| No. | I | II | III | IV | | |
|---|---|---|---|---|---|---|
| | | | | C | H | N |
| 1 | 17.6 | 2,5-dibromo-1,4-quinone-3,6-dicarboxylic acid diisopropylester (M.P.182°). | Blue | Calc. 67.45<br>Found 67.63 | 5.1<br>5.10 | 7.15<br>7.20 |
| 2 | 18.8 | 2,5-dibromo-1,4-quinone-3,6-dicarboxylic acid diisobutylester (M.P. 118°). | do | Calc. 68.00<br>Found 67.72 | 5.42<br>5.30 | 6.90<br>7.20 |
| 3 | 23.2 | 2,5-dibromo-1,4-quinone-3,6-dicarboxylic acid di-n-octylester (M.P. 84°). | do | Calc. 70.20<br>Found 70.11 | 6.50<br>6.44 | 6.06<br>6.18 |

The dibromo esters given in column II are produced by bromination of the corresponding dihydroxyterepththalic acids in glacial acetic acid.

EXAMPLE 9

23 parts of 1-amino-2,5-dimethoxy-4-(3',4'-dimethylbenzoylamino)-benzene, 16.4 parts of 2,5-dibromo-1,4-quinone-3,6-dicarboxylic acid diethyl ester and 1.65 parts of magnesium oxide in 400 parts of ethanol are condensed by heating under reflux for 2 hours. The dianil compound so obtained, after isolation, is heated in 300 parts of 1,2-dichlorobenzene to 170° and then 6 parts of thionyl chloride are added dropwise over a period of 2 hours at this temperature. The reaction mixture is allowed to cool to 100°, the dyestuff formed is filtered off and washed with ethanol and water, after drying, 19 parts of dyestuff are obtained in the form of crystals having a metallic shimmer. In finely dispersed form it has excellent colour strength and excellent fastness to migration, cross-lacquering and light. The pigment has a blue shade.

Pigments having similar good properties are obtained if, instead of the 1-amino-2,5-dimethoxy-4-(3',4'-dimethylbenzoyl-amino)-benzene the amines given in the following table of the general formula

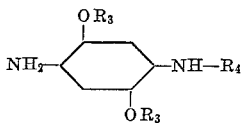

are used.

Column I shows the number of parts of the amine, column II shows the colour of the dioxazine pigment and column III gives their elementary analysis.

| No. | I | $R_3$ | $R_4$ | II | III C | H | N |
|---|---|---|---|---|---|---|---|
| 1 | 19 | —$C_2H_5$ | —$COCH_3$ | Blue | Calc. 60.80<br>Found 60.85 | 5.06<br>5.07 | 8.86<br>8.93 |
| 2 | 25 | —$C_2H_5$ | —CO—⟨⟩—$CH_3$ | Reddish blue. | Calc. 67.45<br>Found 67.25 | 5.10<br>5.13 | 7.15<br>6.98 |
| 3 | 22.8 | —$CH_3$ | —CO—⟨⟩—$CH_3$ | Blue | Calc. 66.55<br>Found 65.98 | 4.75<br>4.61 | 7.40<br>7.29 |
| 4 | 20.3 | —$C_2H_5$ | —$COOCH_3$ | do | Calc. 57.90<br>Found 58.09 | 4.82<br>4.79 | 8.45<br>8.41 |
| 5 | 18 | —$CH_3$ | —$COOCH_3$ | Violet | Calc. 56.50<br>Found 56.73 | 4.40<br>4.14 | 8.80<br>8.92 |
| 6 | 21.7 | —$CH_3$ | —CO—⟨⟩ | Blue | Calc. 66.00<br>Found 65.92 | 4.4<br>4.4 | 7.70<br>7.53 |
| | | | | | | | Cl |
| 7 | 27.2 | —$CH_3$ | —CO—⟨Cl⟩—Cl | Violet | Calc. 55.40<br>Found 55.00 | 3.23<br>3.14 | 16.40<br>16.14 |
| 8 | 26.7 | —$C_2H_5$ | —CO—⟨⟩—Cl | Blue | Calc.<br>Found | | 8.60<br>8.66 |

EXAMPLE 10

If, in Example 5, the 2,5-dibromo-1,4-quinone-3,6-dicarboxylic acid dimethyl ester is replaced by 20.2 parts of 2,5-dibromo-1,4-quinone-3,6-dicarboxylic acid diphenyl ester (M.P. 248°) and the procedure given in that example is followed, then a blue dioxazine pigment is obtained.

Similar pigments are produced if, instead of the 2,5-dibromo-1,4-quinone-3,6-dicarboxylic acid diphenyl ester, the corresponding parts of 2,5-dibromo-1,4-quinone-3,6-dicarboxylic acid dicyclohexyl ester, 2,5-dibromo-1,4-quinone 3,6-dicarboxylic acid dibenzyl ester, 2,5-dibromo-1,4-quinone-3,5-dicarboxylic acid di-p-chlorophenylester
2,5-dibromo-1,4-quinone-3,5-dicarboxylic acid di-p-methylphenylester
2,5-dibromo-1,4-quinone-3,5-dicarboxylic acid di-p-chlorobenzylester
2,5-dibromo-1,4-quinone-3,5-dicarboxylic acid di-p-methylbenzylester,
2,5-dibromo-1,4-quinone-3,5-dicarboxylic acid di(3',4'-dimethyl)-phenylester,
2,5-dibromo-1,4-quinone-3,5-dicarboxylic acid di-(3',4'-dichloro)-phenylester, or
2,5-dibromo-1,4-quinone-3,5-dicarboxylic acid di-(2',5'-dichloro)-benzylester.

are used.

EXAMPLE 11

If, in Example 9, the 1-amino-2,5-dimethoxy-4-(3',4'-dimethylbenzoylamino)-benzene is replaced by 25.8 parts of 1-amino-2,5-dimethoxy-4-(4'-methylbenzene sulphonic acid amino)-benzene and the procedure given in Example 9 is followed, then a violet pigment is obtained the fastness properties of which, however, are not quite as good as those of the pigments described in that example.

A similar violet pigment is obtained if, in this example, the 1-amino-2,5-dimethoxy-4-(4'-methylbenzene sulphonic acid amino)-benzene is replaced by 17.6 parts of 1-amino-2,5-dimethoxy-4-(propionylamino)-benzene.

EXAMPLE 12

12.8 parts of 1-amino-2-methoxy-4-benzoylamino-5-methylbenzene, 8.05 parts of 2,5-dichloro-1,4-quinone-3,6-dicarboxylic acid diethyl ester (M.P. 195°, produced by chlorinating dihydroxy terephthalic acid diethyl ester in carbon tetrachloride) and 4.5 parts of anhydrous sodium acetate in 200 parts of ethanol are refluxed for 5 hours. The red-brown coloured dianil compound formed is filtered off hot, washed with alcohol and water and dried. The yield is 17.3 parts. This product in 200 parts of 1,2-dichlorobenzene is heated for 3 hours at 170–175° with 5.5 parts of benzoyl chloride. The dyestuff then formed is filtered off at 100°, washed with ethanol and water and dried. 8.2 parts of 2,6-dibenzoylamino-3,7-dimethyl-triphendioxazine-9,10-dicarboxylic acid diethyl ester are obtained. After milling with calcium chloride, it is a violet pigment.

If the 1-amino-2-methoxy-4-benzoylamino-5-methylbenzene is replaced by 13.9 parts of 1-amino-2-methoxy-4-benzoylamino-5-chlorobenzene, then a similar pigment having a Bordeaux red shade is obtained.

EXAMPLE 13

13.9 parts of 1-amino-2-methoxy-4-benzoylamino-5-chlorobenzene and 9.6 parts of 2,5-dibromo-1,4-quinone-3,6-dicarboxylic acid dimethyl ester are condensed as described in Example 12 above with 4.5 parts of anhydrous sodium acetate to form the dianil compound and the ring is subsequently closed. In this way, 14.3 parts of 2,6 - dibenzoylamino - 3,7 - dichloro - triphendioxazine-9,10-dicarboxylic acid dimethyl ester are obtained from which, after milling with salt, a Bordeaux red pigment is obtained.

If, in this example, the 1-amino-2-methoxy-4-benzoylamino-5-chlorobenzene is replaced by 12.8 parts of 1-amino-2-methoxy-4-benzoylamino-5-methylbenzene, then a violet pigment having similar good properties is obtained.

EXAMPLE 14

9.1 parts of 3-amino-4-methoxybenzophenone (M.P. 99–100°) and 8.2 parts of 2,5-dibromo-1,4-quinone-3,6-dicarboxylic acid diethyl ester are refluxed for 2 hours in the presence of 0.9 parts of magnesium oxide in 200 parts of ethanol. The orange-red precipitate formed is filtered off hot, washed with ethanol and water and dried. The dianil compound (M.P. 217°) so obtained in 50 parts of 1,2-dichlorobenzene is heated for 4 hours at 170–175° with 2.5 parts of benzoyl chloride. The dioxazine dyestuff crystallises from the cooled reaction mixture as a tile-red coloured product which dissolves in concentrated sulphuric acid with a deep blue colour. It dissolves in hot 1,2-dichlorobenzene with a yellow colour and has a green fluorescence.

If, in this example, the 3-amino-4-methoxybenzophenone is replaced by the amines listed below:

4.9 parts of o-anisidine, a tile-red coloured dianil compound (M.P. 236°) is obtained, from which a dioxazine dyestuff is produced which dissolves in concentrated sulphuric acid with a blue-green colour. It has a strong fluorescence in hot organic solvents; or by 12.2 parts of 4-amino-resorcine-di-(o-cresyl ether), a pale brown-orange coloured dianil compound (M.P. 218°) is obtained, from which a red-brown dioxazine is produced which dissolves in organic solvents with an orange colour and has a strong fluorescence.

EXAMPLE 15

8.5 parts of the dianil compound produced according to Example 7 from 1-amino-2,5-diethoxy-4-benzoylaminobenzene and 2.5-dibromo-1,4-quinone-3,6-dicarboxylic acid diethyl ester are added, in a finely dispersed form, to 150 parts of 100% sulphuric acid while stirring. After stirring for 20 hours at room temperature, the green-blue reaction mixture is poured into 1500 parts of cold water whereupon the dioxazine dyestuff formed precipitates as a fine, deep blue precipitate. To facilitate filtration, the main amount of sulphuric acid is decanted off and then made alkaline with ammonia. After filtering off the product, washing with water and drying, 4.5 parts of a reddish blue dyestuff are obtained which dissolves in hot nitrobenzene with a deep blue colour.

EXAMPLE 16

10 parts of the dianil compound produced according to Example 9 from 1-amino-2,5-diethoxy-4-acetylaminobenzene are heated in 200 parts of trichloroacetic acid in a water bath for 5 hours at 90°. A green-blue solution is formed to which 1000 parts of cold water are added, whereupon the dioxazine dyestuff formed separates out as a violet-blue precipitate. It is filtered off, washed with water, 2 n sodium carbonate and again with water, then with ethanol and finally dried. 8.3 parts of a strongly coloured reddish-blue pigment are obtained which has good stability to light, solvents, cross-lacquering and heat.

The same product is obtained if, instead of tri-chloroacetic acid, 200 parts of dichloroacetic acid or a mixture of these two acids is used.

EXAMPLE 17

5 parts of the dianil produced according to Example 6 from 1-amino-2,5-diethoxy-4-acetylaminobenzene in 100 parts of polyphosphoric acid are heated in a water bath for 5 hours at 90°. 1000 parts of cold water are added to the reaction mixture whereupon the dyestuff formed separates as a violet precipitate. After filtering off, washing with water and drying, 2 parts of a pigment having a violet shade are obtained.

EXAMPLE 18

7.4 parts of 1-amino-2,5-diethoxy-4-benzoylaminobenzene, 6.8 parts of 1-amino-2,5-dimethoxy-4-benzoylaminobenzene, 8.05 parts of 2,5-dichloro-1,4-quinone-3,5-dicarboxylic acid diethyl ester and 1 part of magnesium oxide are condensed under the conditions given in Example 5. 17.2 parts of a dianil compound are obtained. The ring is closed and the dioxazine pigment isolated as also disclosed in Example 5. 11.6 parts of a crystalline product having a metallic shimmer. After milling with salt, a strongly coloured blue pigment is obtained which has a high degree of fastness to light, cross-lacquering and migration.

EXAMPLE 19

3.2 parts fo 2,5-dichloro-1,4-quinone-3,6-dicarboxylic acid diethyl ester and 6 parts of 1-amino-2,5-diethoxy-4-benzoylaminobenzene are heated for 3 hours at 170–175° in 100 parts of o-dichlorobenzene. The reaction mixture is allowed to cool to 100° and the dyestuff formed is filtered off. After washing with 1,2-dichlorobenzene, ethanol and acetone, 2.6 parts of crystals having a metallic shimmer are obtained. This is the same compound as that described in Example 7.

EXAMPLE 20

11.5 parts of 2-aminonaphthalene and 12.8 parts of 2,5-dichloro-1,4-quinone-3,6-dicarboxylic acid diethyl ester in 200 parts of alcohol are refluxed for 1 hour whereupon an orange-red precipitate is formed. After filtering off, washing with ethanol and water and drying, 19.1 parts of a dianil compound which melts at about 250° are obtained which quickly solidifies into a dioxazine compound having a metallic shimmer. 5.4 parts of the dianil compound are heated for 4 hours at 180–190° in 50 parts of nitrobenzene. After cooling, the dyestuff formed is filtered off, washed with ethanol and water and dried. 2.4 parts of a product in the form of crystals having a metallic shimmer are obtained. After milling with salt, a blue pigment of great purity and colour strength is produced.

A blue dioxazine dyestuff is obtained with 16.8 parts of 3-amino-9-ethyl carbazole instead of 2-aminonaphthalene.

If 11.5 parts of 1-aminonaphthalene and 15.3 parts of 2,5-dibromo-1,4-quinone-3,6-dicarboxylic acid dimethyl ester are used as starting materials and the procedure given above is followed, then a reddish violet pigment similar to that obtained from 2-aminonaphthalene is obtained.

EXAMPLE 21

6.4 parts of 5-nitro-2-amino-1-hydroxybenzene, 8.2 parts of 2,5-dibromo-1,4-quinone-3,6-dicarboxylic acid diethyl ester and 3.7 parts of sodium acetate in 100 parts of glacial acetic acid are heated for 10 hours at 110°. The dioxazine dyestuff is formed direct. It is filtered off hot, washed with alcohol and water and dried. 7.8 parts of a dark coloured product are obtained, the elementary analysis of which agrees with 2,6-dinitro-triphendioxazine-9,10-dicarboxylic acid diethyl ester. It dissolves in concentrated sulphuric acid with a deep blue colour and in hot nitrobenzene with a red colour. On reducing with sodium hydrosulphite, the olive green coloured vat containing the amine is obtained which, on oxidising, turns an intensive blue colour.

If 6.4 parts of 4-nitro-2-aminophenol and 7.6 parts of 2,5-dibromo-1,4-quinone-3,6-dicarboxylic acid dimethyl ester are used as starting materials and the procedure described above is followed, then 7.2 parts of a crystalline red-brown coloured product are obtained. Elementary analysis agrees with that of 3,7-dinitro-triphendioxazine-9,10-dicarboxylic acid dimethyl ester.

EXAMPLE 22

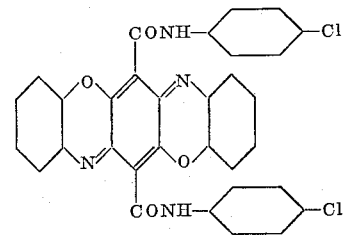

10 parts of triphenodioxazine-9,10-dicarboxylic acid diethyl ester, obtained by the process according to Example 14, are dissolved in 150 parts of 80% sulphuric acid and the solution is heated for 15 hours at 80–90°. The deep blue solution is poured into 1 litre of hot water and the dicarboxylic acid which precipitates is filtered off, washed with water and dried. 8 parts of a dark coloured compound are obtained which, on rubbing on filter paper, has a green metallic shimmer. As printing colour—produced by rubbing the substance with linseed oil and aluminium hydroxide—it has a brown-violet colour.

Analysis of the dicarboxylic acid shows the following values—Calculated: C, 64.1; H, 2.68; N, 7.5. Found: C, 63.97; H, 2.82; N, 7.35.

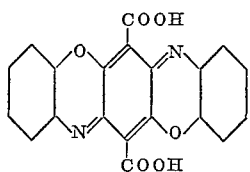

This acid in 200 parts of o-dichlorobenzene is converted with 50 parts of thionyl chloride and a trace of phosphorus pentachloride into the corresponding acid chloride, whereupon the excess thionyl chloride is completely distilled off, the solution of 14 parts of p-chloroaniline in 100 parts of o-dichlorobenzene is added to the residue and the reaction mixture is heated for 2 hours at 170°. The dyestuff formed is then filtered off hot, washed with o-dichlorobenzene and ethanol and dried. The triphenodioxazine-9,10-dicarboxylic acid-di-p-chloranilide is a brown-red pigment which has a high degree of fastness to light and migration.

If the acid chloride is reacted with diethylamine instead of with p-chloraniline, then a pigment of similar shade is obtained.

EXAMPLE 23

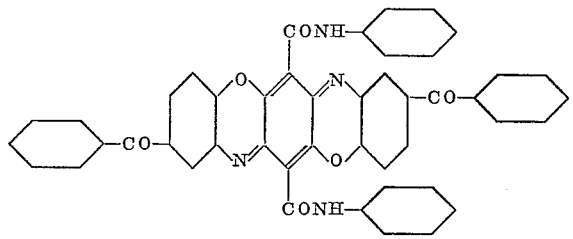

If, in Example 22, the triphenodioxazine-9,10-dicarboxylic acid diethyl ester is replaced by 3,7-dibenzoyl-triphenodioxazine-9,10-dicarboxylic acid diethyl ester, then the dicarboxylic acid of the formula

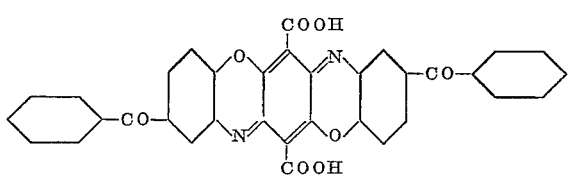

is obtained. As a printing colour it has a reddish violet shade. The acid chloride is produced with thionyl chloride as described in Example 22 and this is reacted with aniline to form the corresponding phenylamide. The dyestuff obtained in this way is a pigment of red-brown shade and it has good fastness to solvents.

EXAMPLE 24

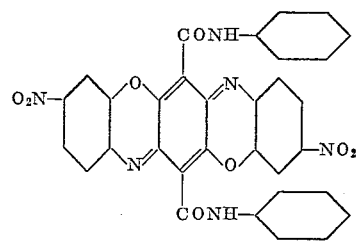

6.6 parts of 5-nitro-2-amino-1-hydroxybenzene, 10.1 parts of 2,5-dibromo-1,4-benzoquinone-3,6-dicarboxylic acid dianilide and 3,6 parts of anhydrous sodium acetate in 150 parts of glacial acetic acid are heated for 4 hours at 110°. The dioxazine dyestuff formed is filtered off hot, washed with ethanol and water and dried. 5 parts of a dark coloured product are obtained which dissolves in concentrated sulphuric acid with a deep blue colour. After milling with salt, it is a violet pigment of good colour strength.

EXAMPLE 25

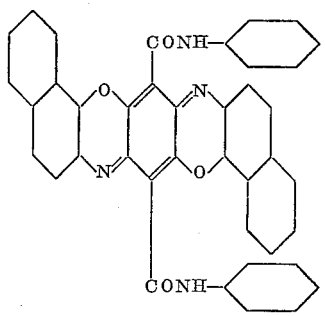

6 parts of 2-naphthylamine, 8.3 parts of 2,5-dichloro-1,4-benzoquinone-3,6-dicarboxylic acid dianilide and 6.4 parts of crystallised sodium acetate are refluxed for 1 hour while stirring. The dark brown coloured dianil formed is filtered off hot, washed with ethanol and water and dried. It is then heated for 2 hours at 230–250° in 200 parts of chloronaphthalene, then cooled to 100° and filtered off. In this way the corresponding dioxazine dyestuff is obtained as a crystalline substance which has a green metallic shimmer. It dissolves in concentrated sulphuric acid with a blue colour and, after milling with calcium chloride, it is a pigment of good colour strength which has good fastness to migration.

A violet dioxazine dyestuff having similar properties is obtained on using 8.4 parts of 3-amino-9-ethylcarbazole instead of 2-aminonaphthalene.

EXAMPLE 26

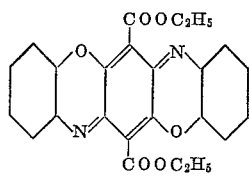

First 50 parts of aluminium chloride and then 20 parts of the dianil of the formula

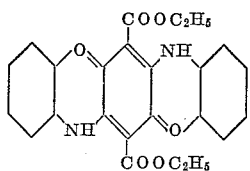

are carefully added at 70–80° to 260 parts of pyridine. The temperature of the reaction mixture is slowly raised to 115° whereupon the colour changes from brown-red to blue. After heating for 8 hours, the reaction mixture is cooled to 50° and diluted with 400 parts of 2 n hydrochloric acid. Another 200 parts of concentrated hydrochloric acid are added to the mixture and then the volume is made up to 1 litre with water. The precipitate is filtered off, washed with water and dried. 15.5 parts of crude product are obtained which are recrystallised from 400 parts of o-dichlorobenzene. After the recrystallisation, the product of the above formula precipitates in an analytically pure form.

EXAMPLE 27

10 parts of triphenodioxazine-9,10-dicarboxylic acid diethyl ester, produced according to the process of Example 14, are dissolved in 150 parts of 80% sulphuric acid and the solution is heated for 15 hours at 80–90°. The deep blue solution is poured into 1 litre of hot water and the dicarboxylic acid which precipitates is filtered off, washed with water and dried. This acid, in 200 parts of o-dichlorobenzene, is converted with 50 parts of thionyl chloride and a trace of phosphorus pentachloride into the corresponding acid chloride and then the excess thionyl chloride is completely distilled off. A solution of 5.4 parts of sodium methylate in 100 parts of methyl alcohol is added to the triphenodioxazine-9,10-dicarboxylic acid chloride which remains. The reaction mixture is heated for 10 hours in a water bath, filtered hot, the product is washed with alcohol and water and dried. A red-brown product in the form of fine needles is obtained. It dissolves in concentrated sulphuric acid with a deep blue colour.

A similar dioxazine dyestuff is obtained if a solution of 13.6 parts of crystallised sodium acetate in 100 parts of isopropyl alcohol is added to the above reaction mixture of the triphenodioxazine-9,10-dicarboxylic acid chloride and then the procedure given above is followed.

EXAMPLE 28

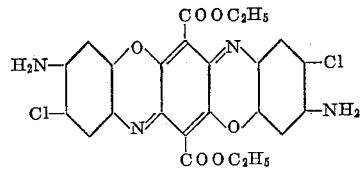

22.1 parts of 2,6-dibenzoylamino-3,7-dichloro-triphenodioxazine-9,10-dicarboxylic acid diethyl ester produced according to the 2nd paragraph of Example 12, are stirred for 15 hours at room temperature in 250 parts of concentrated sulphuric acid, after which the benzoylamino groups are saponified. The reaction product is poured into 2 litres of water and again heated to 90° after which the form and colour of the precipitate change. The precipitate is filtered off, washed with water and dried. 15.1 parts of 2,6-diamino-3,7-dichloro-triphenodioxazine-9,10-dicarboxylic acid diethyl ester are obtained in the formed of fine crystalline needles. After milling with calcium chloride, a blue pigment is obtained which has excellent purity, colour strength and fastness to light.

A similar pigment is obtained if, in this example, instead of the 2,6-dibenzoylamino-3,7-dichloro-triphenodioxazine-9,10-dicarboxylic acid diethyl ester, the 2,6-dibenzoylamino-3,7-dichloro-3-phenodioxazene - 9,10 - dicarboxylic acid dimethyl ester obtained according to Example 13 is used.

EXAMPLE 29

A colour for graphic purposes is obtained by mixing and rubbing on a set of three mixing rollers 2 parts of the pigment, obtained according to Example 6 from 1-amino-2,5-diethoxy-4-acetylaminobenzene and 2,5-dibromo-,1,4-quinone-3,6-dicarboxylic acid dimethyl ester and then milling with salt, with 36 parts of aluminium hydroxide, 60 parts of linseed oil varnish of medium viscosity and 0.2 parts of cobalt linoleate. Violet prints of great colour strength and also good fastness to light are obtained with this colour paste.

EXAMPLE 30

0.6 parts of the pigment produced according to Example 2 from 1-amino-2,4-di-(2'-methylphenoxy)-benzene and milling with salt, 67 parts of polyvinyl chloride, 33 parts of dioctyl phthalate, 2 parts of dibutyl tin dilaurate and 2 parts of titanium dioxide are mixed together and then worked for 10–15 minutes at 140° on a set of mixing rollers. Red polyvinyl chloride films are obtained therefrom which have very good fastness to migration and light.

EXAMPLE 31

10 parts of titanium dioxide, 35 parts of a 60% solution of a modified urea-alkyd resin in xylene/butanol 1:1, 10 parts of terpentine oil and 5 parts of xylene are milled in a ball mill for 48 hours with 2 parts of the pigment obtained according to Example 3 from 1-amino-2,4-diphenoxybenzene and 2,5-dibromo-1,4-benzoquinone-3,6-dicarboxylic acid dianilide. If this coloured lacquer is poured onto aluminium films and they are stoved for 1 hour at 120°, then coatings are obtained which are distinguished by an excellent pure red shade and very good fastness to light, heat and cross-lacquering.

What is claimed is:
1. A dioxazine dyestuff of the formula

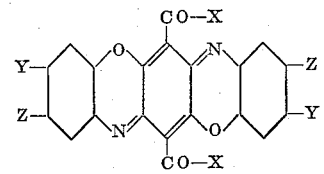

wherein

X is a member selected from the group consisting of cyclohexyloxy, alkoxy with maximally 8 carbon atoms, phenoxy, chlorophenoxy, methylphenoxy, dichlorophenoxy, dimethylphenoxy, benzyloxy, methylbenzyloxy, chlorobenzyloxy and dichlorobenzyloxy, and the group

wherein
$R_1$ is a member selected from the group consisting of hydrogen, lower alkyl, phenyl, chlorophenyl, methylphenyl, dichlorophenyl, dimethylphenyl, nitrophenyl, naphthyl, benzyl, chlorobenzyl, methylbenzyl and dichlorobenzyl, and $R_2$ is a member selected from the group consisting of hydrogen and lower alkyl and $R_1$ and $R_2$ when taken together with the adjacent nitrogen atom are a member selected from the group consisting of pyrrolidino, piperidino and morpholino,
Z is a member selected from the group consisting of hydrogen, chlorine, lower alkyl, lower alkoxy, benzoyl, lower alkylsulfonyl, lower carbalkoxy and —CO—NH—$R_3$, wherein $R_3$ is a member selected from the group consisting of phenyl, methylphenyl, chlorophenyl, dimethylphenyl and dichlorophenyl,
Y is a member selected from the group consisting of hydrogen, amino, lower alkanoylamino, lower carbalkoxy amino, lower alkoxy, benzoylamino, chlorobenzoylamino, dichlorobenzoylamino, phenoxy, methylphenoxy, methoxyphenoxy, chlorophenoxy and benzyloxy.
2. The dioxazine dyestuff of the formula

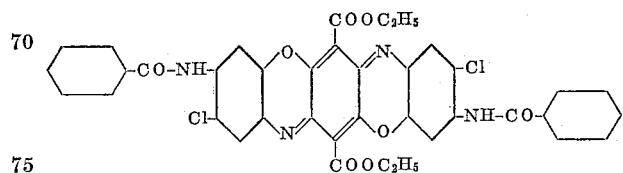

3. The dioxazine dyestuff of the formula
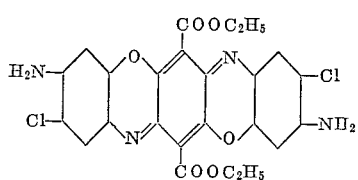
4. The dioxazine dyestuff of the formula
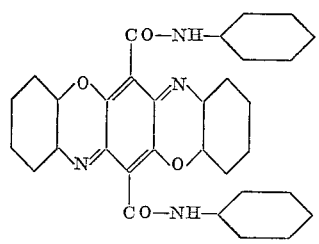
5. The dioxazine dyestuff of the formula
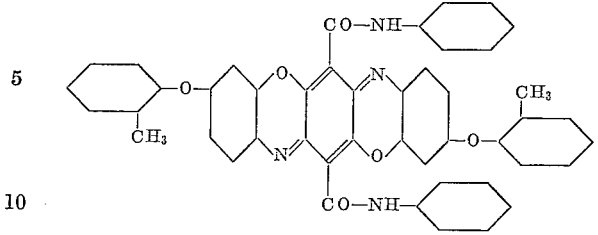
6. The dioxazine dyestuff of the formula
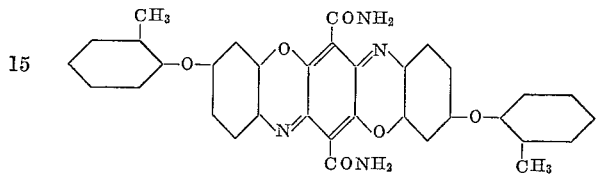
References Cited in the file of this patent
UNITED STATES PATENTS
3,065,229    Ronco _____ Nov. 20, 1962